Oct. 6, 1964 V. J. JANDASEK 3,151,457
HYDROKINETIC TORQUE TRANSMITTING MECHANISM
Filed April 11, 1963 3 Sheets-Sheet 1

INVENTOR:
VLADIMIR J. JANDASEK
BY
ATTORNEYS.

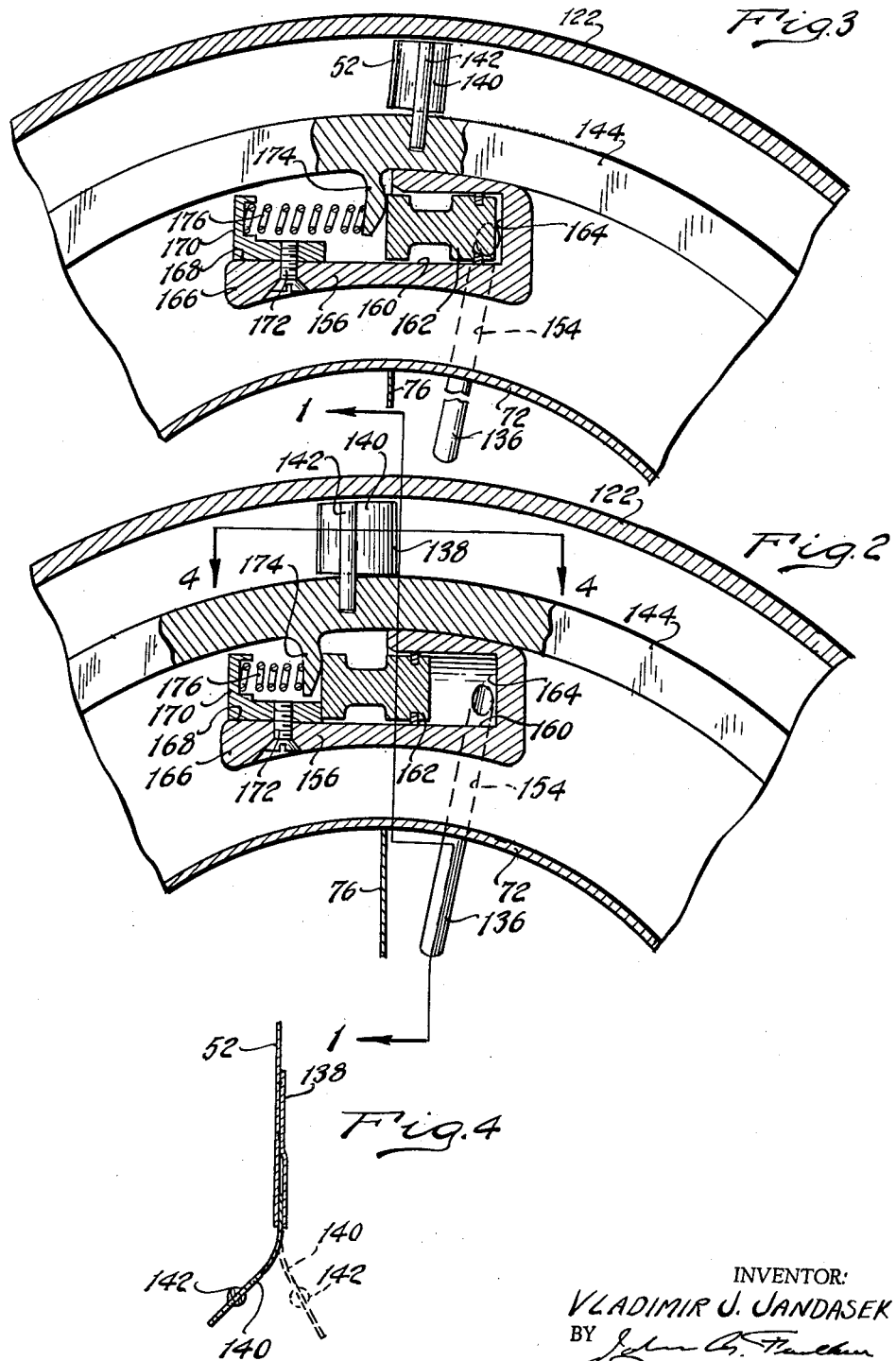

LEGEND :

$u$ = LINEAR VELOCITY OF POINT ON IMPELLER EXIT
$U$ = LINEAR VELOCITY OF POINT ON TURBINE EXIT
$v$ = ABSOLUTE FLUID VELOCITY ALONG IMPELLER BLADE
$V$ = ABSOLUTE FLUID VELOCITY ALONG TURBINE BLADE
$V'$ = ABSOLUTE FLUID VELOCITY ALONG STATOR BLADE
$w$ = RELATIVE FLUID VELOCITY AT IMPELLER EXIT
$W$ = RELATIVE FLUID VELOCITY AT TURBINE EXIT
$W'$ = RELATIVE FLUID VELOCITY AT STATOR EXIT
$f$ = TORUS FLOW AT IMPELLER EXIT
$F$ = TORUS FLOW AT TURBINE EXIT
$F'$ = TORUS FLOW AT STATOR EXIT
$\gamma$ = IMPELLER EXIT BLADE ANGLE
$T'$ = TURBINE EXIT BLADE ANGLE
$T''$ = STATOR EXIT BLADE ANGLE

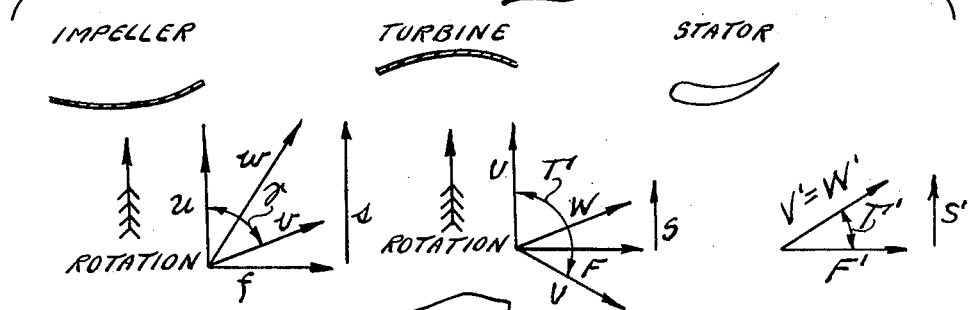

Fig. 5

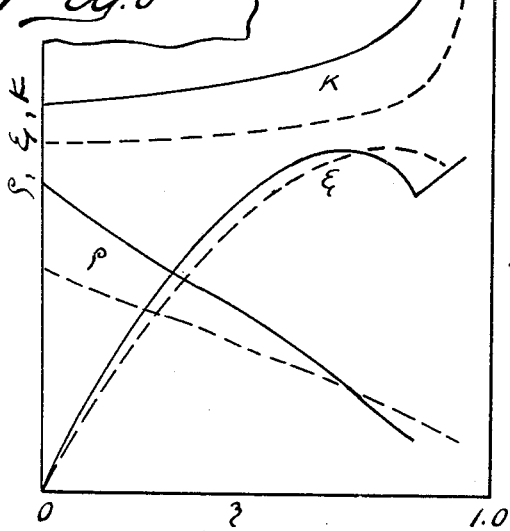

Fig. 6

$k = \sqrt{\dfrac{\text{IMPELLER SPEED}}{\text{IMPELLER TORQUE}}}$ $\rho$ = TORQUE RATIO $\jmath$ = SPEED RATIO $\xi$ = EFFICIENCY

INVENTOR:
VLADIMIR J. JANDASEK
ATTORNEYS

United States Patent Office 3,151,457
Patented Oct. 6, 1964

3,151,457
HYDROKINETIC TORQUE TRANSMITTING
MECHANISM
Vladimir J. Jandasek, Dearborn, Mich., assignor to Ford
Motor Company, Dearborn, Mich., a corporation of
Delaware
Filed Apr. 11, 1963, Ser. No. 272,325
4 Claims. (Cl. 60—54)

My invention relates generally to torque transmitting mechanisms of the hydrokinetic type, and more particularly to a hydrokinetic torque converter capable of being used in a drive-line of an automotive vehicle for transferring power from a vehicle engine to the power input element of a gear unit.

The improved torque converter mechanism of my invention is characterized by a dual performance range. It is capable of providing a relatively high torque ratio under stall conditions and during low speed ratio operation without any sacrifice in the quality of performance during operation in a relatively high speed ratio range. The torque multiplication carryout is improved by reason of the change in the performance range that is available.

A modification in the performance chracteristic of my invention can be achieved by altering the physical blade geometry of the impeller member of the torque converter mechanism. Provision is made for adjusting the angularity of the exit sections of the impeller blades to provide an optimum geometry for high performance low speed ratio operation as well as an optimum geometry for high efficiency cruising performance.

In a preferred form of my invention, I have provided a three element torque converter that comprises a bladed impeller, a bladed turbine and a bladed stator situated in toroidal fluid flow relationship. Each blade exit section of the impeller is provided with a flexible region. The trailing edge of the impeller blades may be adjusted in a tangential direction by flexing the blades either in the direction of rotation of the impeller or in a direction opposite to the direction of rotation. The absolute fluid flow velocity vector for the fluid that traverses the bladed section of the impeller will be changed in direction as the angularity of the impeller blades themselves is changed. Thus, for any given driving torque the effective torque multiplication ratio can be altered and the so-called size factor for the converter unit can be tailored to suit any particular operating requirement.

If the angularity of the exit sections of the impeller blades is changed by moving the trailing edge of the impeller blades in the direction of rotation of the impeller, the torque ratio both at stall and at low speed ratios is decreased although the coupling efficiency is improved. On the other hand, if the exit sections of the impeller blades are adjusted in the opposite direction, the torque ratio of the torque converter mechanism at low speed ratios is improved although the coupling efficiency is reduced. I contemplate, therefore, that the torque converter mechanism can be conditioned for high performance operation when rapid acceleration is required, such as during emergencies, by adjusting the blade exit sections of the impeller blades in a direction that is opposite to the direction of rotation of the impeller.

This blade adjustment is accomplished in my improved structure by means of a servo in the form of an annular ring situated within the inner torus region of the torque converter mechanism. The annular ring is acted upon by pressure operated servo parts that are carried by the inner impeller blade shroud. Upon application of a control signal to the servo parts, the annular member is shifted relative to the impeller. This shifting motion occurs in a tangential direction and is translated into an adjusting motion of the impeller blade exit sections through simple pin connections.

In a hydrokinetic unit of this type the impeller torque is equal in magnitude to the moment of momentum of the hydraulic fluid that leaves the exit section of the impeller less the moment of momentum of the fluid that enters the impeller. Similarly, the moment of momentum of the fluid that enters the turbine less the moment of momentum of the fluid that leaves the trubine is equal to the turbine torque. Since the torus circuit defined by the torque converter unit is a closed, continuous flow circuit, the moment of momentum of the fluid that enters the entrance section of the turbine is equal to the moment of momentum of the fluid that leaves the exit section of the impeller. It follows, therefore, that the turbine torque is equal to the moment of momentum of the fluid that leaves the exit section of the impeller less the moment of momentum that leaves the exit section of the turbine.

The moment of momentum of a particle of fluid at any point in the circuit is equal to the mass of that particle times its operating radius with respect to the axis of rotation of the torque converter unit times the tangential component of the absolute fluid flow velocity vector of that particle. In the case of the turbine exit section, this component is shown at "S" in FIGURE 5. The effective turbine torque therefore can be reduced for any given impeller torque by decreasing the tangential component of the absolute fluid flow velocity vector at the turbine entrance section. This component is shown at "s" in FIGURE 5. This can be accomplished by varying the angularity of the impeller exit section of the impeller by moving the trailing edge of the impeller blades in the direction of rotation. This will result, therefore, in a reduced torque ratio although the coupling efficiency will be increased and the so-called torque converter size factor will be decreased. For purposes of this description, this size factor will be defined as the impeller speed divided by the square root of the impeller torque.

If the impeller blade exit sections are adjusted in the other direction, of course the opposite result is obtained. That is, the angential component of the absolute fluid flow velocity vector at the exit section of the impeller and at the entrance section of the turbine is increased as the trailing edges of the impeller blades are adjusted in a direction opposite to the direction of rotation of the impeller. This, of course, results in a maximum change in the moment of momentum of the fluid as it passes through the bladed passages of the turbine which results in an increased turbine torque and an increased torque ratio for any given impeller torque. The torque converter size factor increases and the coupling efficiency decreases under these conditions.

For the purpose of describing more particularly the improvements of my invention, reference will be made to the accompanying drawings, wherein:

FIGURE 1 is taken along the plane of section line 1—1 of FIGURE 2;

FIGURE 2 is a partial transverse cross sectional view taken along section line 2—2 of FIGURE 1;

FIGURE 3 is a view similar to FIGURE 2 except that the exit sections of the impeller blades are adjusted to a different angular position;

FIGURE 4 is a cross sectional view taken along the plane of section line 4—4 of FIGURE 2;

FIGURE 5 is a schematic vector representation of a particle of fluid as it traverse the toroidal fluid flow circuit; and FIGURE 6 is a performance chart for the torque converter mechanism of FIGURE 1 showing both performance ranges.

Figure 1:
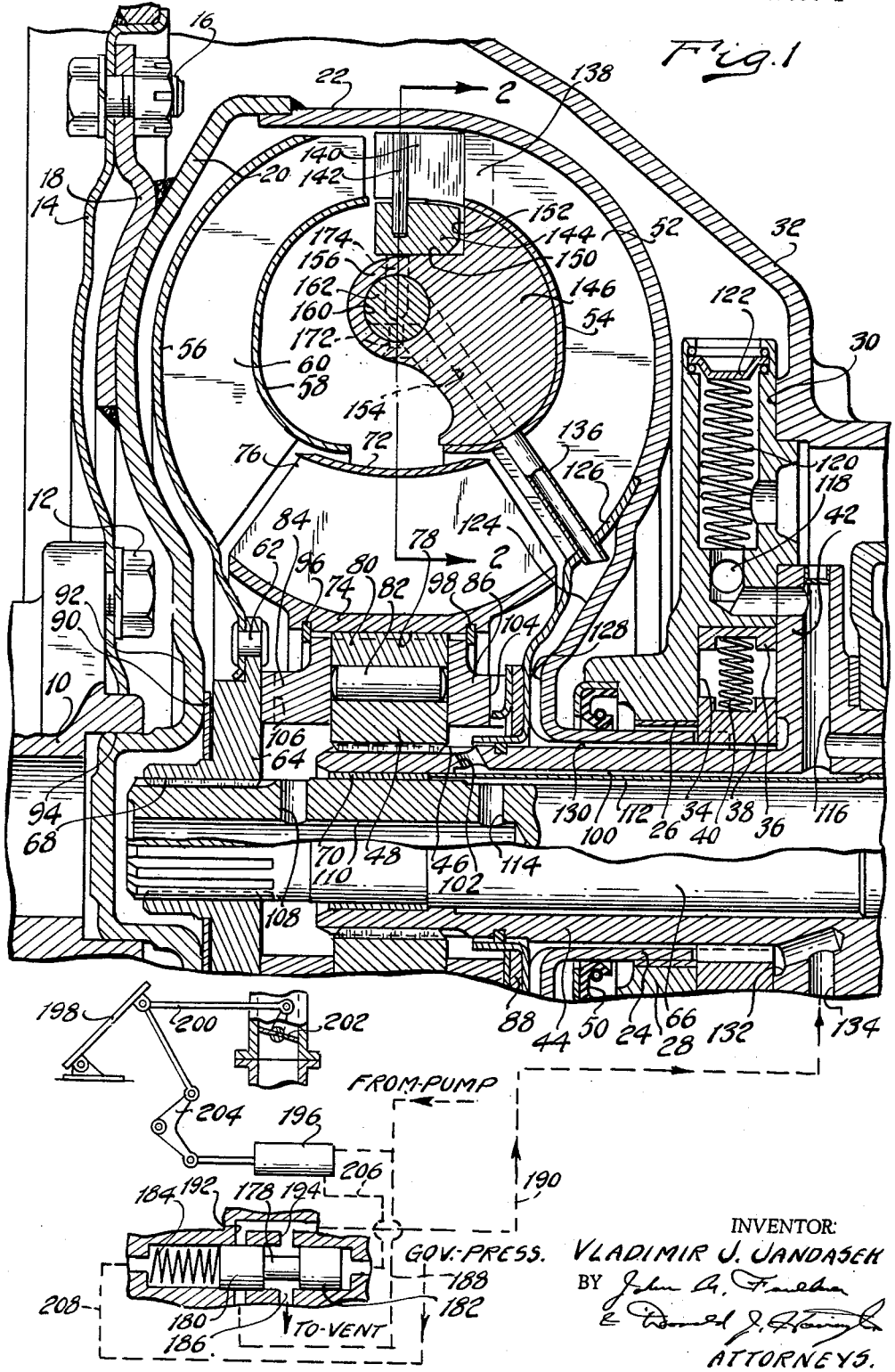
FIGURE 1 shows in cross sectional form an assembly view of my improved torque converter.

Referring first to FIGURE 1, numeral 10 designates generally a flanged engine crankshaft for an internal combustion vehicle engine. Bolted to the crankshaft flange by bolts 12 is a drive plate 14 which is secured at its periphery by means of bolts 16 to the drive element 18. Element 18 in turn is welded as indicated to an impeller shell part 20.

The shell part 20 is welded at its periphery to a companion shell part 22 to form an integral toroidal impeller shell.

The hub of shell part 22 is in the form of an axial sleeve shaft 24 which in turn is journaled by bearing 26 within an opening formed in a positive displacement pump housing 28. This housing 28 forms a transverse wall that is secured at its periphery to a shoulder 30 formed on a transmission housing 32. Suitable bolts, not shown, may be provided for this purpose.

Pump housing 28 defines a pump cavity 34 within which are positioned pump elements 36 and 38. Element 38 can be in the form of a rotor having peripheral recesses within which the elements 36 are positioned. Element 36 can be in the form of slippers that cooperate with an eccentrically situated inner surface of the pump chamber within which the elements 36 and 38 are situated. Slipper elements 36 are biased normally into engagement with the surrounding arcuate surface of the cavity 34 by springs 40.

The pump housing is closed by an adaptor plate 42 having a stationary extension shaft 44 formed thereon. This extension shaft is splined externally, as shown at 46, to an inner race 48 for an overrunning coupling for the torque converter stator subsequently to be described.

A fluid seal 50 is situated between the sleeve shaft 24 and the pump housing 28.

The adaptor 42 can be ported suitably to provide a fluid flow path from high pressure regions of the pump chamber 34 to fluid pressure operated portions of an automatic control circuit. It may be supplied from a supply port, not shown, which in turn communicates with a transmission sump defined by the lower portion of the housing 32. The positive displacement pump serves also as a source of regulated pressure for filling the torque converter torus circuit and maintaining it at a desired operating pressure level. The operating pressure level is established by a regulator valve which forms a portion of the control valve system, not shown.

The impeller shell part 22 has secured to its inner periphery a plurality of impeller blades 52. The outer margins of the blades 52 are secured to the inner toroidal surface of the shell part 22 in a conventional fashion. For example, the blades 52 can be formed with tabs which may be received within cooperating recesses formed in the inner surface of the shell part 22 for maintaining the blades 52 relatively fixed.

The inner margins of the blades 52 are secured to an inner shroud 54.

Disposed in toroidal fluid flow relationship with respect to the impeller is a turbine that comprises an outer torus shroud 56, an inner torus shroud 58 and a plurality of turbine blades 60. The blades are situated between the shrouds 56 and 58 and define therewith radial inflow passages. The blades 60 can be secured to the shrouds 56 and 58 at their outer and inner margins respectively in a conventional fashion. The hub of shroud 56 is secured by rivets 62 to a turbine hub member 64. A turbine shaft 66 is splined as shown at 68 to the hub 64. Shaft 66 in turn is journaled by a bushing 70 within the end of stationary sleeve shaft 44.

Situated between the flow exit section of the turbine and the flow entrance section of the impeller is a bladed stator which comprises a first shroud 72 and a second shroud 74. Situated between the shrouds 72 and 74 is a plurality of stator blades 76 which are adapted to change the magnitude and direction of the fluid flow velocity vector for the fluid that leaves the turbine exit section before it enters the impeller entrance section.

Shroud 74 is provided with a hub which is apertured as shown at 78 to receive an outer overrunning coupling race 80. This race is splined to internal splines formed in the opening 78 and may be cammed to provide a camming action with rollers 82 the latter being disposed between the races 48 and 80.

Thrust elements 84 and 86 are situated on either side of the overrunning coupling races. Element 84 engages turbine hub 64 and element 86 engages a thrust washer 88 that is situated adjacent the hub of the impeller shell part 22.

A thrust washer 90 is disposed between turbine hub 64 and a hub 92 for the shell part 20. This hub 92 is extended as indicated and may be piloted within a pilot recesss 94 formed in the crankshaft 10.

Thrust elements 84 and 86 are internally splined to internal splines in the reactor hub opening 78. They are held fast against axial shifting movement by snap rings 96 and 98.

To fill the fluid flow circuit of the torque converter, fluid is introduced to the annular passage defined by the stationary sleeve shaft 44 and the exterior of a sleeve 100. This annular passage communicates with a radially extending port 102 formed in shaft 44. The fluid which passes through port 102 passes radially outward through a radial groove 104 formed in thrust element 86. It then passes through the space between shroud 74 and the inner surface of the shell part 22. Fluid is introduced into the circuit in this fashion, and it circulates through the torus circuit and returned radially inwardly through a return flow passage that is defined in part by the spacing between the end of shroud 74 and the turbine shroud 56. The flow passes radially inwardly through radial groove 106 and through a radial passage 108 to a central passage 110 formed in turbine shaft 66.

Passage 100 in turn communicates with an annular passage defined by the inner surface of sleeve 100 and the outer surface of sleeve shaft 66. This annular passage is identified by reference character 112. Communication between passage 112 and passage 110 is established by radial passage 114. The fluid then is returned from passage 112 to low pressure regions of the torus circuit.

The supply passage defined in part by radial port 102 communicates with a passage 116 which extends through the adaptor 42. This passage in turn communicates with a pressure relief valve 118 which maintains a limiting pressure in the converter circuit. This valve 118 is in the form of a ball which can be urged into cooperating engagement with a surrounding flow passage by a spring 120. This spring is seated by spring seat member 122 that is held by the pump housing 28.

The hub of shell part 22 is recessed as indicated at 124. Disposed over this recess 124 is a plate 126 having a radially outward portion that conforms in shape to the shape of the inner surface of the shell part 22 to define a continuation of the fluid flow passages of the impeller blade. The radially inward portion of blade 126 is disposed between thrust washer 88 and the innermost hub portion of shell part 22. This innermost hub portion, however, is formed with radial grooves 128 which engage the plate 126. These grooves communicate with an annular passage 130 which is defined by the inner surface of the sleeve shaft 24 and the outer surface of the stationary sleeve shaft 44. This passage communicates with an annular groove 132 formed in the adaptor 42. Groove 132 in turn communicates with a passage 134.

One or more recesses 124 can be provided as desired. Communicating with each recess 124 is a pressure distributor tube 136 having an open end that communicates with the interior of the recess 124 and with passage 130. It extends through the fluid flow path defined by the impeller blades and through a registering opening in the inner shroud 54.

Referring next to FIGURE 4, each blade 52 has secured thereto a tab 138. Disposed between tab 138 and the exit edge of the blade 52 is a flexible blade portion 140. This blade portion forms a continuation of the blade 52 and is disposed within the outermost peripheral surface of the shell part 22.

Secured to each flexible blade portion 140 is an adjusting pin 142 that extends in a generally radial direction as indicated in FIGURE 1. This pin is received within a cooperating opening formed in an annular ring 144 which is mounted concentrically about the axis of the converter adjacent the flow exit margin of the shroud 54.

The tabs 138 can be secured to the blades 52 by spot welding, by rivets or by any other suitable assembly technique.

Ring 144 is positioned upon a toroidal servo member 146 that is secured within the interior of shroud 54. This member 146 defines a bearing surface 150 upon which the ring 144 is shiftably mounted. Clearance is provided between one side of the ring 144 and the adjacent shoulder 152 of the member 146.

The member 146 is formed with an internal passage 154 which communicates with the opening in the distributor tube 136. Member 146 is formed also with a boss 156 within which is formed a tangentially extending cylindrical opening 160. A shiftable piston 162 disposed within the opening 160 cooperates with the opening to define a pressure chamber 164. I contemplate that the boss 156 and the member 146 may be formed as a one piece casting. A plurality of bosses 156 and cylindrical openings 160 can be provided.

As best seen in FIGURES 2 and 3, boss 156 is formed also with an extension 166 having a flat surface 168. Secured to this extension 166 is a spring seat 170, suitable screws 172 being provided for this purpose.

Ring 144 is formed with a radially inwardly extending finger 174. It is situated in the path of motion of piston 162 so that when fluid pressure is admitted to the chamber 164, the piston 162 will be shifted in a tangential direction thereby causing the ring 144 to rotate in a counter-clockwise direction as viewed in FIGURE 2.

This shifting motion of the ring 144 is opposed by a spring 176 that is seated upon the spring seat 170.

Shifting motion of the ring 144 will be accompanied by a bending motion of the blade elements 140 by reason of the pin connection described previously. When fluid pressure is admitted to the chamber 164, the blade elements and the piston assume the position shown in FIGURE 2. When this pressure chamber is exhausted, however, the spring 176 returns the ring 144 and the piston 162 to the position shown in FIGURE 3. Two positions of the blade elements 140 are illustrated in FIGURE 4.

Pressure distribution to the chamber 164 can be controlled by a driver operated shift valve 178 as illustrated in FIGURE 1. This valve comprises a pair of spaced valve lands 180 and 182. It is urged in a right-hand direction by a valve spring 184.

An exhaust port 186 communicates with the valve chamber within which valve element 178 is situated. Communicating also with this valve chamber is a passage 188, which in turn communicates with the high pressure side of the positive displacement pump shown in part at 36 and 38. The rotor element 38 is keyed in driving relationship with respect to sleeve shaft 24 and thus pressure is made available whenever the vehicle engine is operating.

A pressure feed passage 190 communicates also with the shift valve chamber. This communication is established in two spaced ports identified separately by reference characters 192 and 194. Passage 190 in turn communicates with passage 134 so that when it is pressurized, pressure is distributed to the pressure cavity 164 of each blade adjusting servo.

A driver controlled performance valve 196 communicates with passage 188. It is actuated by the vehicle operator upon movement of a vehicle engine accelerator pedal 198 which in turn is connected by means of a suitable linkage 200 to the engine vehicle carburetor valve 202. Accelerator pedal 198 is connected to a suitable linkage mechanism 204 to the performance valve 196.

When the vehicle accelerator pedal is moved to a position corresponding to an advanced engine carburetor throttle setting, valve 196 establishes communication between passage 188 and a kickdown pressure passage 206 which in turn communicates with the right-hand end of the shift valve chamber for valve element 178.

Communicating with the left-hand end of this same valve chamber is a governor pressure passage 208 which in turn communicates with a power output shaft driven governor mechanism.

When the valve element 178 assumes the position shown, port 192 and passage 188 are blocked. Passage 190, however, communicates with vent port 186 through the annular space between valve lands 180 and 182. If the vehicle operator moves the accelerator pedal to an advanced engine throttle position, however, control pressure made available to the shift valve will move the element 178 in a left-hand direction thereby blocking port 194 and establishing communication between passage 188 and passage 190. This results, of course, in a shifting movement of the ring 144 and a corresponding adjustment of the impeller blade exit section to a high performance position. As explained previously, the exit sections of the impeller blades are adjusted in a tangential direction opposite the direction of rotation of the impeller under these circumstances.

At very high vehicle speeds, the governor pressure passage 208 will inhibit adjustment of the shift valve to a high preformance position.

Under certain design conditions the valve 196 can be adapted to distribute to passage 206 a modulated pressure that is proportional in magnitude to degree of engine accelerator pedal movement. The governor pressure that then acts upon the shift valve 178 will vary the point at which the modulated throttle valve pressure will initiate a shift to the high performance range. A greater engine carburetor throttle setting must then be established at higher vehicle speeds than at lower vehicle speeds before a shift in the high performance range will be accomplished.

In FIGURE 4 I have illustrated diagrammatically the flow vectors for a particle of fluid at the flow exit section of the impeller, the flow exit section of the turbine and the flow exit section of the stator or reactor. As previously explained, the tangential component of the absolute fluid flow velocity vector at the impeller exit is substantially the same as the corresponding vector at the turbine entrance. It will be apparent that this tangential component is of greater magnitude at the turbine entrance than the corresponding vector component at the turbine exit, the former vector being indicated by the symbols $s$ and the latter being indicated by the symbol $S$.

The impeller exit angle $\gamma$ has a definite influence on the magnitude of the vector $S$. Thus, if the angle $\gamma$ is changed there will then be a change in the moment of momentum of the fluid that passes through the bladed turbine passages. The characteristics of the unit, therefore, can be changed by appropriately adjusting the angularity of the impeller exit. This is done in the manner described.

In FIGURE 5 I have illustrated a performance chart showing the efficiency of the torque ratio and the size factor for each speed ratio. The full lines represent the high performance condition of the converter and the dotted lines represent the cruising performance condition. It will be observed that the torque ratio at lower speed ratios is increased during high performance operation. The efficiency is decreased at high speed ratios. The corresponding change in size factor is also very apparent in FIGURE 5.

Having thus described a preferred embodiment of my invention, what I claim and desire to secure by U.S. Letters Patent is:

1. In a hydrokinetic torque converter mechanism comprising bladed impeller and turbine members disposed in toroidal fluid flow relationship, said impeller having blades defining radial outflow passages, a blade adjusting member carried by said impeller and adapted to move with respect to said impeller, said impeller blades having a section of fixed angularity and a flexible flow exit section, pressure operated servo means for moving said blade adjusting member, a mechanical connection between said blade adjusting member and the flexible flow exit section of each impeller blade whereby the angularity of the latter with respect to the fixed blade sections can be altered upon movement of said blade adjusting member, and means for distributing pressure selectively to said servo means for actuating the same, the impeller blade flow exit sections being adapted for adjustment by said servo means in the direction of rotation of said impeller to condition said mechanism for high efficiency performance with a reduced size factor where size factor is measured for any given speed ratio by the impeller speed divided by the square root of the impeller torque, said flow exit sections being adjustable in a direction opposite to the direction of rotation of said impeller to condition said mechanism for high torque ratio operation at any given speed ratio with an increased size factor.

2. The combination as set forth in claim 1 wherein said flexible blade exit sections are secured in cantilever fashion to the associated fixed blade section, the free end of said flow exit sections being adapted to be moved tangentially by said servo means relative to the fixed end thereof.

3. A hydrokinetic torque transmitting mechanism comprising bladed impeller and turbine members situated in toroidal fluid flow relationship, said impeller having blades defining radial outflow passages, said passages being defined in part by inner and outer impeller blade shrouds, a first servo member secured to said inner shroud, an annular blade adjusting ring mounted for limited tangential movement upon said first servo member at a region adjacent the flow exit section of said impeller blades, a second servo member cooperating with said first servo member to define a pressure cavity, an inwardly extending portion of said ring being disposed in the path of movement of said second servo member, a mechanical connection between said ring and each blade exit section, and means for distributing selectively fluid pressure to said pressure cavity for adjusting said ring, said impeller blades including a relatively fixed section and a flexible section, said flexible section being secured to the flow exit region of said first section in cantilever fashion, the free end of said flexible section being connected mechanically to said ring, the impeller blade flow exit sections being adapted for adjustment by said servo means in the direction of rotation of said impeller to condition said mechanism for high efficiency performance with a reduced size factor where size factor is measured for any given speed ratio by the impeller speed divided by the square root of the impeller torque, said flow exit sections being adjustable in a direction opposite to the direction of rotation of said impeller to condition said mechanism for high torque ratio operation at any given speed ratio with an increased size factor.

4. The combination as set forth in claim 3 wherein spring means are provided for biasing said second servo member in one tangential direction to resist the fluid pressure force applied to said second servo member.

References Cited in the file of this patent

UNITED STATES PATENTS

| | | |
|---|---|---|
| 2,453,795 | Jandasek | Nov. 16, 1948 |
| 2,805,549 | Hensleigh et al. | Sept. 10, 1957 |
| 3,083,589 | Knowles et al. | Apr. 2, 1963 |